Nov. 1, 1960 C. J. FOLAND 2,958,166
ATTACHMENT FOR A ROTARY TOOL
Filed July 30, 1958

INVENTOR:
CLAUDE J. FOLAND
By Gravely, Lieder & Woodruff
ATTORNEYS.

2,958,166
Patented Nov. 1, 1960

2,958,166

ATTACHMENT FOR A ROTARY TOOL

Claude J. Foland, 5608 Albia Terrace, Jennings, Mo.

Filed July 30, 1958, Ser. No. 751,908

4 Claims. (Cl. 51—195)

This invention relates generally to attachments for rotary tools and more particularly to a novel backing or supporting means for mounting an abrasive or like work element on a power drill.

The principal object of the present invention is to provide an attachment for a rotary tool having greatly improved operational characteristics, and which facilitates rapid change in work elements. A more specific object is to provide a drill attachment or the like having a resilient support easily assembled and removed from a rigid hub member and to which work elements may be applied by adhesive or the like. Another object is to provide a simplified, economically manufactured, highly efficient attachment.

Briefly, the invention is embodied in an attachment having a unitary hub member with a radially-extending serrated platen face and an axially-extending core having an enlarged head, a resilient member adapted to be assembled on the core and seated on the serrated platen face, and a work element to be applied over the resilient member and enlarged head of the hub member core.

Figure 1:
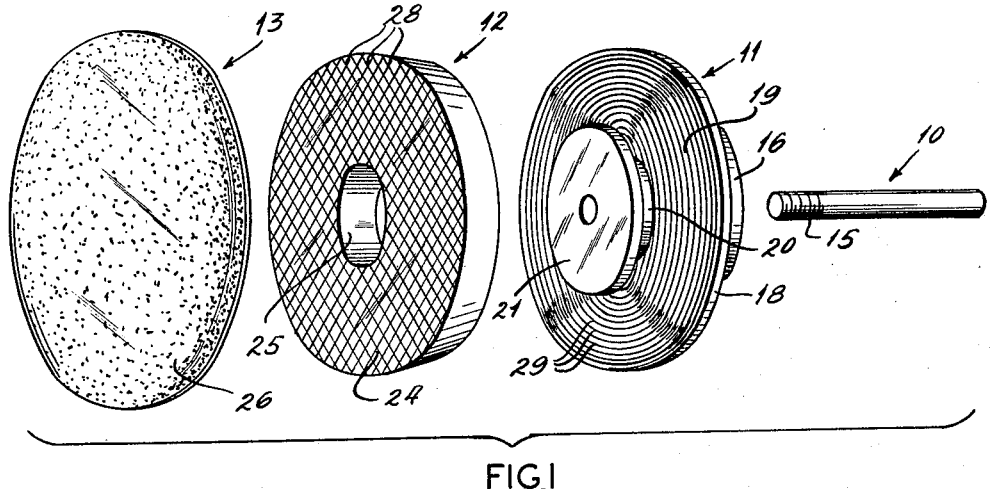
Figures 2, 3, 4, 5:
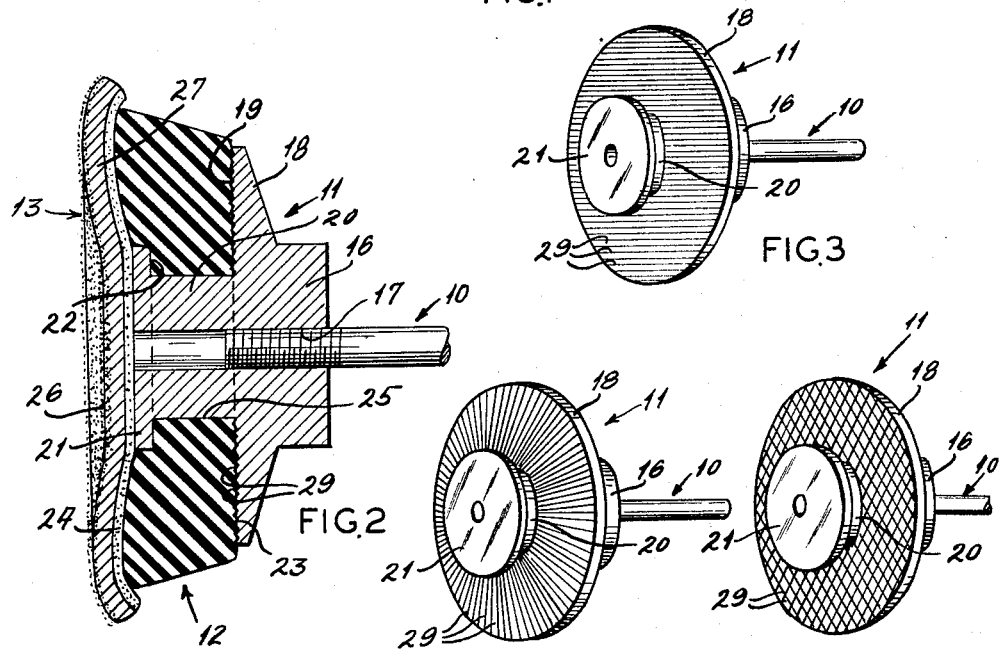
Figure 6:
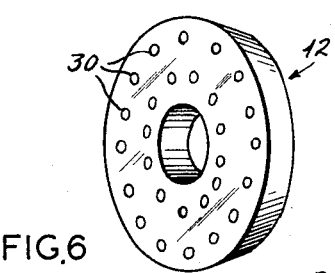

The invention also consists of the parts and the arrangements and combinations of parts hereinafter described and claimed. In the accompanying drawings which constitute a part of this specification and wherein like numerals refer to like parts wherever they occur:

Fig. 1 is an exploded perspective view of the parts embodying the present attachment, Fig. 2 is a greatly enlarged cross-sectional view of the attachment with the parts assembled, Fig. 3 is a perspective view of a modified form of the hub member of the attachment, Fig. 4 is a view similar to Fig. 3 of another modified hub member, Fig. 5 is a view similar to Fig. 3 of another modified hub member, and Fig. 6 is a view similar to Fig. 3 of still another modified hub member.

Referring now to the drawings in detail, it will be seen that the present rotary attachment comprises a spindle or shaft 10, a hub member 11, a resilient member 12 and a work element 13. The spindle 10 is adapted to be mounted in the chuck of a rotary tool (not shown) and has a threaded end 15 for engagement with the hub member 11 whereby the attachment may be mounted on the tool for rotation.

The hub member 11 is a unitary construction including a body portion 16 with a threaded axial bore 17 for receiving the threaded end 15 of the spindle 10 and a flange portion 18 formed integral with the body portion 16. The flange portion is frusto-conical in cross-section and includes a substantially radial surface 19 adapted to seat the resilient member 12 as will be more fully described presently. The hub member 11 also includes an axial core 20 or the like formed integral with the flange portion 18 and projecting from the surface 19 thereof, and an enlarged head 21 is formed integral with the free end of the core 20 and has an abutment or retaining surface 22 in opposed spaced relationship with the surface 19 of the flange 18.

The resilient member 12 has a frusto-conical body with surfaces 23 and 24 which are substantially radial when the member 12 is not assembled, and an axial bore 25 is formed through the member 12 between these surfaces. The bore 25 is large enough to receive the core 20 of the hub member 11 therein, but is normally smaller than the diameter of the enlarged head 21. The surface 23 of the member 12 is adapted to be seated on the surface 19 of the flange 18 and the other surface 24 is depressed to be engaged by the abutment 22 of the enlarged head 21 when the members 11 and 12 are assembled.

The resilient member 12 is formed of any suitable resilient material for providing a flexible back pad for the work element 13 and it is apparent that different degrees of flexibility may be provided by forming the member 12 of different resilient materials. However, the flexibility must be great enough to permit the member 12 to be distorted or stretched so that the bore 25 can be passed around the enlarged head 21 to position the member around the core 20 between the surfaces 19 and 22. If desired, a central portion of the member 12 around the bore 25 may be formed of highly flexible material and the outer portion of the member 12 formed of a relatively non-flexible material bonded or otherwise secured to the inner flexible portion.

The work element 13 has an outer abrasive, buffing, polishing, or like work surface 26 and an inner surface 27 adapted to be removably attached to the surface 24 of the resilient member 12 and over the enlarged head 21 of the hub member 11 by a suitable adhesive. It is apparent that the work element 13 is an imperforate disc to provide an increased surfacing area compared with conventional attachment constructions utilizing a screw member or the like to retain the work element on the back pad therefor.

The invention also resides in certain non-torsional characteristics of the parts whereby the present attachment has an improved operation over conventional attachments. As shown in Fig. 1, the surface 24 of the resilient member 12 may be provided with non-planar portions 28 such as bosses, ribs, grooves or the like to form a frictional type contact with the attachment surface 27 of the work element, and the surface 23 may also be provided with similar non-planar portions for frictional contact with the radial surface 19 of the flange 18. In addition, the surface 19 of the flange 18 is provided with a plurality of serrations 29 for gripping the inner surface 23 of the resilient member 12 when the member 12 is compressed by the application of the attachment to a work piece (not shown). The serrations 29 are preferably not concentric with the axis of the hub member 11, although such an arrangement may have improved operational characteristics as compared with the characteristics of a resilient pad seated on a planar surface. Preferably, the serrations 29 are formed as a continuous spiral groove relative to the axis of the hub member 11 (Fig. 1), but the serrations may also be formed as chords of the circular flange 18 (Fig. 3), radial serrations (Fig. 4), cross-hatch serrations or knurled surface (Fig. 5) or the like. The flexibility or compressibility of the resilient member material, the depth and arrangement of serrations 29 and the pressure of the attachment against a work piece will, of course, determine the degree of anti-torque established between the member 12 and the flange 18.

As shown in Fig. 6, the resilient member 12 may also be provided with a plurality of axially extending openings 30 between the surfaces 23 and 24 thereof. These openings 30 form a heat dissipating means for more rapidly carrying heat generated between the work element 13 and a work piece from the former. In addition, the openings increase the anti-torque characteristics between the members by reason of the tendency to create a vacuum therein during operation of the attachment.

The parts of the present attachment are quickly assembled or disassembled by distorting the axial bore 25 in the resilient member 12 to pass over the enlarged head 21 of the hub member 11. When assembled, the surface 23 is positioned against the serrated surface 19 of the flange 18. It will be noted that the serrated surface 19 of the flange 18 forms a platen or support for nearly the entire surface 23 of the resilient member 12. The surface 24 is depressed at the central portion of the resilient member to be received behind the enlarged head 21 or in abutting contact with the surface 22 thereof. As shown in Fig. 2, when the member 12 is assembled on the hub member 11, the surface 24 is recessed at the central portion thereof so that the outer periphery of the surface 24 is in a plane outwardly of the enlarged head 21. In other words, the work element attaching face 24 of the resilient member 12 projects beyond the enlarged head so that when work treating pressures are exerted between the tool and the work piece, the resilient member 12 will be compressed to exert a resilient force on the work element 13. When treating flat surfaces, the peripheral portion of the surface 24 will be compressed in a substantially conterminous relationship with the outer surface of the enlarged head, and it is apparent that convex objects can be treated easily by reason of the natural concavity of the surface 24 relative to the rigid head 21. In surfacing concave objects, the resilient peripheral portion of the attachment is used.

It is now apparent that an improved attachment for a rotary tool is provided having ease of assembly or disassembly for changing resilient members or work elements, and having a simplified, economically-manufactured construction. It is also apparent that improved efficiency of operation is obtained with the present attachment.

This disclosure is intended to cover all changes and modifications of the present invention which will be readily apparent to all skilled in the art, and the invention is to be limited only by the claims which follow.

What I claim is:

1. An attachment for a rotary tool comprising a rigid hub member having a flange portion with a serrated platen surface, an integral core extending centrally from said platen portion, and relatively small abutment means extending radially from said core and having an abutment surface in opposed spaced relation with said platen portion, a resilient member removably positioned on said core between said opposed platen surface and abutment surface, said resilient member including a first surface area seated against the serrated portion of said platen surface, and a work element adhesively applied to another surface area of said resilient member.

2. In an attachment for a rotary tool a resilient back-pad for a work element, a rigid hub member having the back-pad assembled thereon and removable therefrom, the hub member including a frictional platen surface and relatively small, centrally disposed abutment means in spaced opposed relationship with the platen surface, said resilient back-pad comprising a frusto-conical shaped member having substantially radial surfaces in dis-assembled condition and said radial surfaces being centrally compressed between said platen surface and abutment means on said hub member whereby one of said surfaces has a central concavity, the peripheral portion of said one surface projecting forwardly of the rigid hub member to provide axial compressibility of the periphery of the resilient member toward said platen surface.

3. An attachment for a rotary tool comprising a rigid hub member having a platen portion and a relatively small abutment means in fixed spaced relation with said platen portion, a resilient member having first and second surfaces centrally compressed and removably positioned between said platen portion and abutment means, said first surface being seated on and supported by said platen portion and said second surface being a work element attaching surface the outer periphery of which is in a plane outwardly of said abutment means and substantially parallel thereto, and frictional means for preventing relative rotation between said members.

4. An attachment for a rotary tool comprising a rigid hub member including a relatively large circular platen portion having a frictional surface and a relatively small holding portion connected centrally to said platen portion and having an abutment surface in spaced relation with said frictional surface, a resilient back-pad removably assembled on said hub member between said frictional and abutment surfaces, said back-pad having first and second surfaces and being substantially uniform in thickness between said surfaces in an unassembled condition, said first surface being circular and substantially coextensive in area with said frictional surface and seated thereon, said second surface having a slightly larger circular area than said first surface and being seated against said abutment surface, said resilient back-pad between said first and second surfaces adjacent to the center thereof being compressed between said frictional and abutment surfaces, and an imperforate work element adhesively attached to said second surface and covering said holding portion.

References Cited in the file of this patent
UNITED STATES PATENTS

| | | |
|---|---|---|
| 472,823 | Ross | Apr. 12, 1892 |
| 577,860 | Keighley | Mar. 2, 1897 |
| 1,779,682 | Stratford | Oct. 28, 1930 |
| 2,480,217 | Burnham | Aug. 30, 1949 |
| 2,581,567 | Wiley | Jan. 8, 1952 |
| 2,767,528 | Tocci-Guilbert | Oct. 23, 1956 |